United States Patent
Jang et al.

(10) Patent No.: US 10,452,162 B2
(45) Date of Patent: Oct. 22, 2019

(54) TOUCH DISPLAY DEVICE, AND TOUCH DRIVING CIRCUIT AND METHOD OF DRIVING SAME

(71) Applicant: LG Display Co., Ltd., Seoul (KR)

(72) Inventors: HyunWoo Jang, Goyang-si (KR); SuWon Lee, Ansan-si (KR)

(73) Assignee: LG Display Co., Ltd., Seoul (KR)

( * ) Notice: Subject to any disclaimer, the term of this patent is extended or adjusted under 35 U.S.C. 154(b) by 85 days.

(21) Appl. No.: 15/782,738

(22) Filed: Oct. 12, 2017

(65) Prior Publication Data
US 2018/0107292 A1    Apr. 19, 2018

(30) Foreign Application Priority Data
Oct. 13, 2016    (KR) ........................ 10-2016-0133166

(51) Int. Cl.
  G06F 3/0354    (2013.01)
  G06F 3/041    (2006.01)
  G06F 3/044    (2006.01)

(52) U.S. Cl.
  CPC .......... G06F 3/03545 (2013.01); G06F 3/044 (2013.01); G06F 3/0412 (2013.01); G06F 3/0416 (2013.01)

(58) Field of Classification Search
  CPC .... G06F 3/03545; G06F 3/0412; G06F 3/044; G06F 3/0416
  See application file for complete search history.

(56) References Cited

U.S. PATENT DOCUMENTS

| | | | | |
|---|---|---|---|---|
| 2008/0158177 A1* | 7/2008 | Wilson | .................. | G06F 3/0416 345/173 |
| 2010/0302180 A1* | 12/2010 | Chang | ..................... | G06F 3/045 345/173 |
| 2011/0187663 A1* | 8/2011 | Lin | ......................... | G06F 3/041 345/173 |
| 2012/0105362 A1* | 5/2012 | Kremin | ............... | G06F 3/03545 345/174 |
| 2012/0133616 A1* | 5/2012 | Nishihara | ............. | G06F 3/0325 345/175 |
| 2014/0306898 A1* | 10/2014 | Cueto | ................. | G06F 3/04883 345/173 |

* cited by examiner

Primary Examiner — Abbas I Abdulselam
(74) Attorney, Agent, or Firm — Polsinelli PC

(57) ABSTRACT

The present disclosure provides a touch display device and a touch driving circuit which support touch sensing of an active pen, and a method of driving the same. Sensing data acquired during a first sensing time period in a pen position sensing section may be transmitted as one data packet, and a plurality of pieces of sensing data acquired during a second sensing time period shorter than the first sensing time period in a pen data sensing section may be transmitted as one data packet, so that it is possible to reduce an unnecessary sensing time period when pen data is sensed, while preventing sensing data transmission sections from overlapping each other. In addition, information about a Most Significant Bit (MSB) of the sensing data to be transmitted when the sensing data is transmitted may be transmitted in the pen data sensing section, so that it is possible to easily restore the sensing data while minimizing a loss of the sensing data.

20 Claims, 11 Drawing Sheets

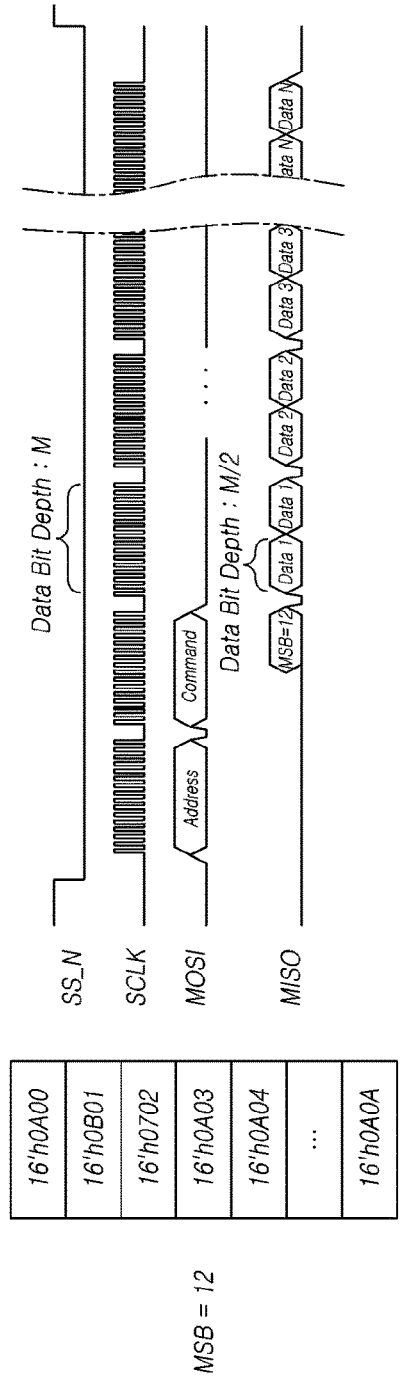
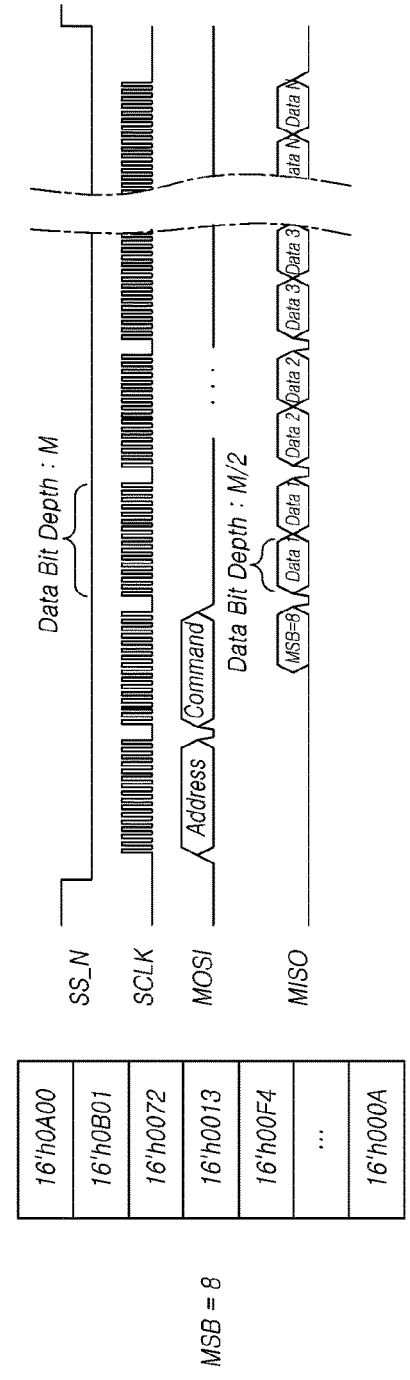
FIG.9A
FIG.9B

TOUCH DISPLAY DEVICE, AND TOUCH DRIVING CIRCUIT AND METHOD OF DRIVING SAME

CROSS REFERENCE TO RELATED APPLICATION

This application claims priority from Korean Patent Application No. 10-2016-0133166, filed on Oct. 13, 2016, which is hereby incorporated by reference in its entirety for all purposes as if fully set forth herein.

BACKGROUND

Field of the Disclosure

The present disclosure relates to a display device, and more particularly, to a touch display device that supports touch recognition of an active pen, and a touch driving circuit included in the touch display device and a method of driving the same.

Description of the Background

As the information society develops, various demands for a display device for displaying an image are increasing, and various types of display devices such as a liquid crystal display device, a plasma display device, an organic light emitting display device, and the like are provided.

In addition to the function of displaying an image, the display device recognizes a touch on a display panel and provides a function of performing input processing according to the recognized touch, thereby enabling various functions to be provided through the display device.

For example, the display device that provides a touch function recognizes a user's finger touch (finger touch) with respect to a display panel or recognizes a touch (pen touch) by a device such as a pen to perform input processing on the display device.

When the user's finger touch is recognized, a capacitance change between a touch sensor of the display panel and a user's finger may be sensed when the finger touch occurs, and thereby the touch may be recognized.

The pen touch may be recognized in the same manner as the finger touch when a conductive material is contained in the pen, and a touch of the active pen that emits a pen voltage, so that a touch sensor can detect the corresponding pen can be sensed through a voltage change of the touch sensor due to the pen voltage emitted from the active pen.

In the display device providing a function of sensing the finger touch or the pen touch, a touch driving circuit receives a sensing signal from the touch sensor of the display panel and transmits sensing data based on the sensing signal to a touch controller, so that the touch controller can recognize whether a touch occurs, touch coordinates, and the like, and perform other input processing on the touch.

In order to improve the performance of the touch sensing, reception of the sensing signal from the touch sensor and transmission of the sensing data to the touch controller may be performed in parallel.

However, since a time interval required for the touch sensing does not match a time interval required for the transmission of the sensing data, an unnecessary time period for the touch sensing and the transmission of the sensing data may be wasted, and therefore there is a demand for effectively performing the touch sensing and the transmission of the sensing data.

SUMMARY

In this section, an aspect of the present disclosure is to provide a touch display device and a touch driving circuit, which may improve the transmission efficiency of sensing data according to touch sensing in a touch system for an active pen.

Another aspect of the present disclosure is to provide a touch display device and a touch driving circuit, which may minimize a loss of transmitted sensing data while improving the transmission efficiency of sensing data according to touch sensing.

In accordance with an aspect of the present disclosure, there is provided a touch display device including: a touch display panel in which a plurality of touch sensors is arranged; a touch driving circuit configured to receive a sensing signal from the plurality of touch sensors during a first sensing time period in a first touch driving section, and to receive a sensing signal from the plurality of touch sensors during a second sensing time period shorter than the first sensing time period in a second touch driving section; and a touch controller configured to receive sensing data converted based on the sensing signal from the touch driving circuit.

Here, the first touch driving section may be a finger position sensing section or a pen position sensing section, and the second touch driving section may be a pen data sensing section.

Also, the touch driving circuit of the touch display device may transmit the sensing data acquired during one sensing time period in the first touch driving section as one data packet, and transmit the sensing data acquired during a plurality of sensing time periods in the second touch driving section as one data packet.

Also, the touch driving circuit may transmit the sensing data acquired during one sensing time period in the first touch driving section as M-bit data, and transmit the sensing data acquired during one sensing time period in the second touch driving section as M/2-bit data.

Also, the touch driving circuit may include a plurality of multiplexers which are connected to each touch sensor group including at least one touch sensor to apply a touch driving signal, and transmit the sensing data acquired by driving one multiplexer in the first touch sensing section as one data packet, and transmits the sensing data acquired by driving the plurality of multiplexers in the second touch sensing section as one data packet.

Also, the touch driving circuit may transmit information about a Most Significant Bit (MSB) of the sensing data transmitted in the second touch driving section to the touch controller.

Also, the information about the MSB may be transmitted in a section in which the touch driving circuit receives command information from the touch controller, and may be changed according to a size of the sensing data transmitted in the second touch sensing section and transmitted.

In accordance with another aspect of the present disclosure, there is provided a touch driving circuit including: a touch sensor driving unit configured to output a touch driving signal to a plurality of touch sensors arranged in a touch display panel; a sensing signal reception unit configured to receive a sensing signal from the plurality of touch sensors during a first sensing time period in a first touch driving section, and to receive a sensing signal from the plurality of touch sensors during a second sensing time period shorter than the first sensing time period in a second touch driving section; and a sensing data transmission unit configured to convert the sensing signal into sensing data and to transmit the sensing data to a touch controller.

Here, the sensing data transmission unit may transmit the sensing data acquired during one sensing time period in the first touch driving section as one data packet, and transmit the sensing data acquired during a plurality of sensing time periods in the second touch driving section as one data packet.

In accordance with still another aspect of the present disclosure, there is provided a method of driving a touch driving circuit, including: receiving a sensing signal during a first sensing time period in a first touch driving section from a plurality of touch sensors arranged in a touch display panel; transmitting sensing data acquired during one sensing time period in the first touch driving section as one data packet; receiving a sensing signal during a second sensing time period in a second touch driving section; and transmitting sensing data acquired during a plurality of sensing time periods in the second touch driving section as one data packet.

As described above, according to the present aspects, an unnecessary time required for touch sensing can be reduced by setting a sensing time period differently according to data sensed in a sensing section in a touch display device.

Also, according to the present disclosure, by composing transmission bits of sensing data differently according to a sensing time period for sensed data, it is possible to improve sensing data transmission efficiency and to prevent sensing data transmission sections performed in parallel with a touch sensing time period from overlapping each other.

Further, according to the present disclosure, information about a Most Significant Bit (MSB) of the sensing data to be transmitted in a touch driving circuit may be changed and transmitted, thereby minimizing a loss of the sensing data and improving the sensing data transmission efficiency.

BRIEF DESCRIPTION OF THE DRAWINGS

The above features and advantages of the present disclosure will be more apparent from the following detailed description taken in conjunction with the accompanying drawings, in which:

FIGS. 9A and 9B are diagrams illustrating a method of transmitting information about a most significant bit (MSB) of sensing data when the sensing data is transmitted in a touch display device according to the present disclosure;

DETAILED DESCRIPTION

Figure 1:
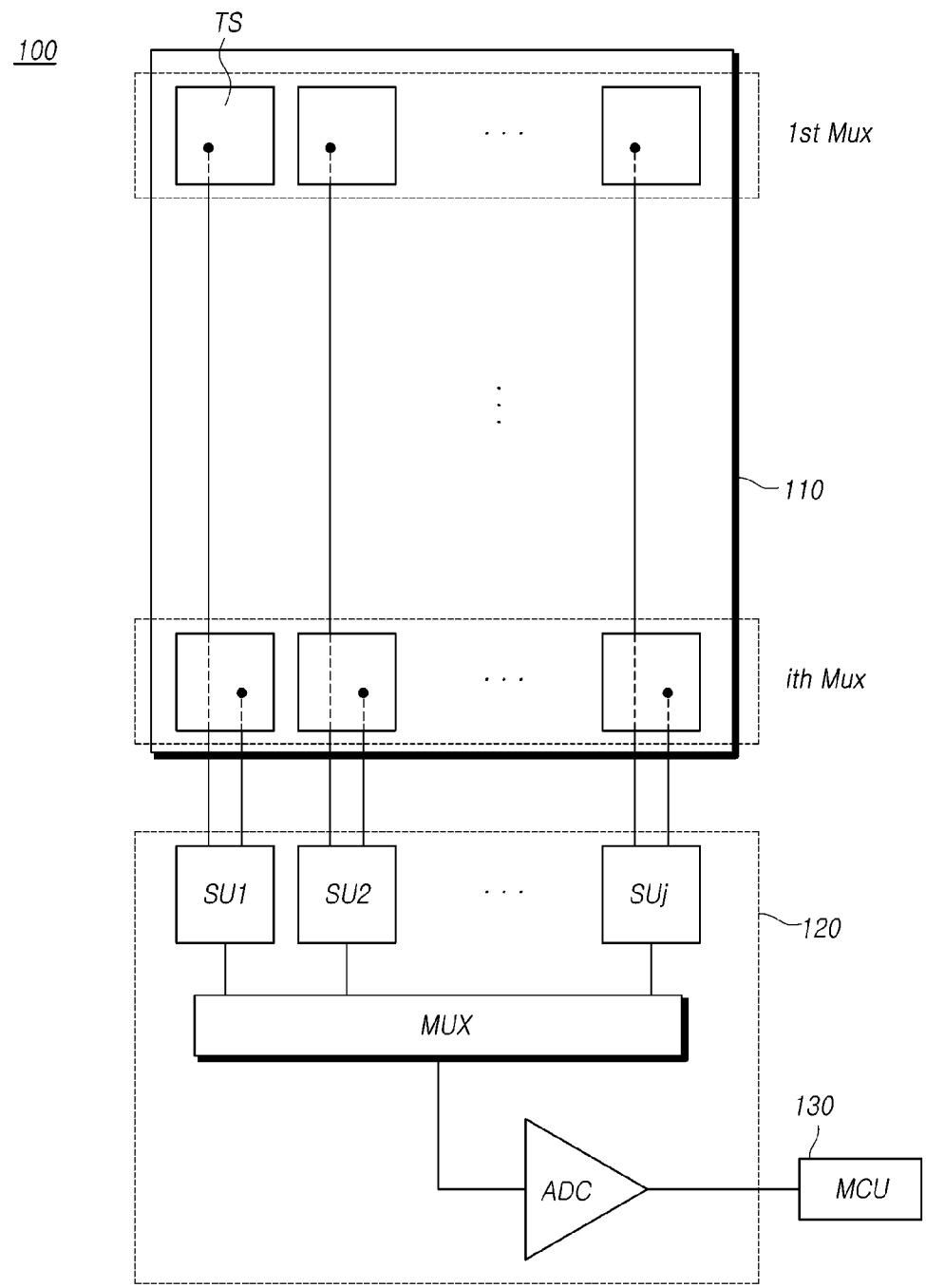
FIG. 1 is a diagram illustrating the schematic configuration of a touch display device according to aspects of the present disclosure.

Hereinafter, some aspects of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a diagram illustrating the schematic configuration of a touch display device 100 according to the present disclosure.

Referring to FIG. 1, a touch display device 100 according to the present disclosure includes a touch display panel 110 in which a plurality of touch sensors TS are arranged, a touch driving circuit 120 that drives the touch sensor TS and receives a sensing signal from the touch sensor TS, and a touch controller 130 that receives sensing data from the touch driving circuit 120 and performs data processing according to touch recognition.

The plurality of touch sensors TS may be arranged on the touch display panel 110 or may be embedded and arranged in the touch display panel 110.

When the touch sensor TS is embedded in the touch display panel 110, the touch sensor TS may be a common electrode to which a common voltage is applied during display driving. Accordingly, a common voltage may be applied to the touch sensor TS during display driving and a touch driving signal may be applied to the touch sensor TS during touch driving.

Each of the plurality of touch sensors TS is connected to the touch driving circuit 120 through a touch wiring, and receives the touch driving signal.

When touch sensing is performed by a mutual capacitance method, the touch wiring may be constituted of a TX wiring to which the touch driving signal is applied and an RX wiring at which the sensing signal is received. When touch sensing is performed by a self-capacitance method, the touch driving signal and the sensing signal may be transmitted and received through a single touch wiring connected to each touch sensor TS.

The touch driving circuit 120 applies the touch driving signal to the plurality of touch sensors TS in a touch driving section, receives the sensing signal from the touch sensor TS, and transmits the received sensing signal to the touch controller 130.

When touch sensing is performed by the mutual capacitance method, the touch driving circuit 120 outputs the touch driving signal through a multiplexer connected to each touch sensor group TSG including the plurality of touch sensors TS, and receives the sensing signal from the touch sensor TS through a sensing unit SU.

The touch driving circuit 120 converts the sensing signal received from the touch sensor TS into digital sensing data via an analog-to-digital converter (ADC), and transmits the digital sensing data to the touch controller 130.

The touch controller 130 receives the sensing data from the touch driving circuit 120, determines a touch occurrence, touch coordinates, and the like based on the received sensing data, and performs input processing according to touch recognition.

When recognizing a finger touch on the touch display panel 110, the touch controller 130 senses a capacitance change between the touch sensor TS and a user's finger using the sensing data received from the touch driving circuit 120, and determines a touch occurrence, touch coordinates, and the like.

When recognizing a touch of the active pen on the touch display panel 110, the touch controller 130 senses a voltage change of the touch sensor TS due to a voltage emitted from the active pen, and determines the occurrence of a touch of the active pen, the touch coordinates, and the like.

When the touch of the active pen is sensed, the active pen emits a voltage synchronized with a voltage applied to the touch sensor TS, and transmits data such as a pen pressure of the active pen, whether a button is operated, battery information, and the like (hereinafter, referred to as "pen data") to the touch display panel 110.

By way of example, the active pen may emit a voltage synchronized in a positive phase with the voltage applied to the touch sensor TS in order to transmit data "0", and emit a voltage synchronized in a reverse phase with the voltage applied to the touch sensor TS in order to transmit data "1".

The sensing signal received from the touch driving circuit 120 by the voltage emitted from the active pen may be controlled to be higher than or lower than a baseline, so that the pen data of the active pen may be transmitted to the touch controller 130.

That is, the touch driving circuit 120 may sense a finger touch position regarding to the touch display panel 110, sense a touch position of the active pen, or sense the pen data transmitted from the active pen.

The touch driving circuit 120 may perform such finger position sensing, pen position sensing, and pen data sensing in a time division manner, and transmit the sensing data in parallel with touch sensing to the touch controller 130.

Figure 2:
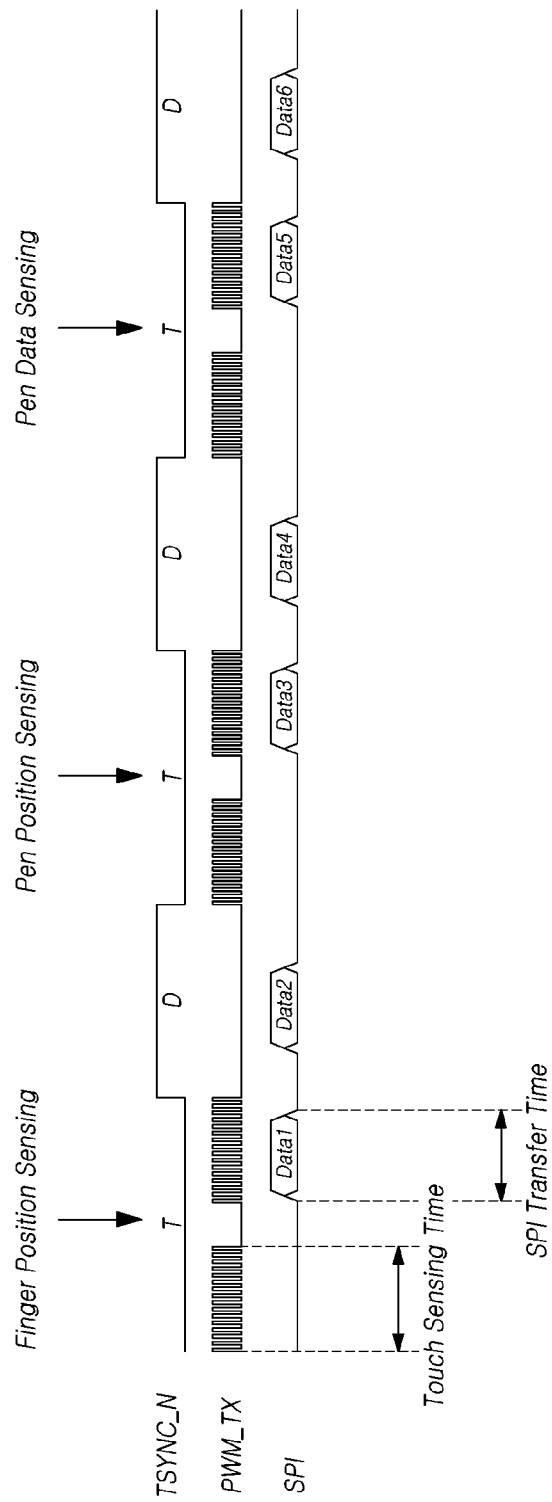
FIG. 2 is a diagram illustrating a timing for performing touch sensing and sensing data transmission in a touch display device according to the present disclosure.

FIG. 2 is a diagram illustrating a timing at which the touch driving circuit 120 performs touch sensing and a timing at which the touch driving circuit 120 transmits sensing data in the touch display device 100 according to the present disclosure.

Referring to FIG. 2, the touch driving circuit 120 may perform finger position sensing, pen position sensing, pen data sensing, and the like in a touch driving section resulting from time-dividing a display driving section.

The touch driving circuit 120 receives a sensing signal from the touch sensor TS arranged on the touch display panel 110 in each of a finger position sensing section, a pen position sensing section, and a pen data sensing section of the touch driving section, and transmits sensing data converted based on the sensing signal to the touch controller 130.

The touch driving circuit 120 performs touch sensing by sequentially applying a touch driving signal to each of touch sensor groups TSG connected to respective multiplexers, and performs sensing data transmission in parallel with the touch sensing.

The touch driving circuit 120 performs touch sensing on the touch sensor group TSG connected to a first multiplexer, performs touch sensing on the touch sensor group TSG connected to a second multiplexer, and transmits sensing data acquired from a first touch sensor group TSG to the touch controller 130.

At this time, the touch driving circuit 120 and the touch controller 130 may be connected through an interface such as an I2C bus, a serial peripheral interface (SPI), and a system bus.

Since touch sensing and sensing data transmission are performed in parallel in the touch driving section, a touch sensing time period is set to be longer than a sensing data transmission time period so that sensing data transmission sections do not overlap each other.

Here, when pen data is sensed, a higher resolution is not required as compared with when a finger position or a pen position is sensed. Therefore, although sensing is possible during a short sensing time period, a long sensing time period is maintained so that the sensing data transmission sections do not overlap each other.

Hereinafter, a sensing data transmission timing and method will be described in detail with reference to FIGS. 3 to 5, and a problem that a sensing time period cannot be set to be short when pen data is sensed will be described in detail.

Figure 3:
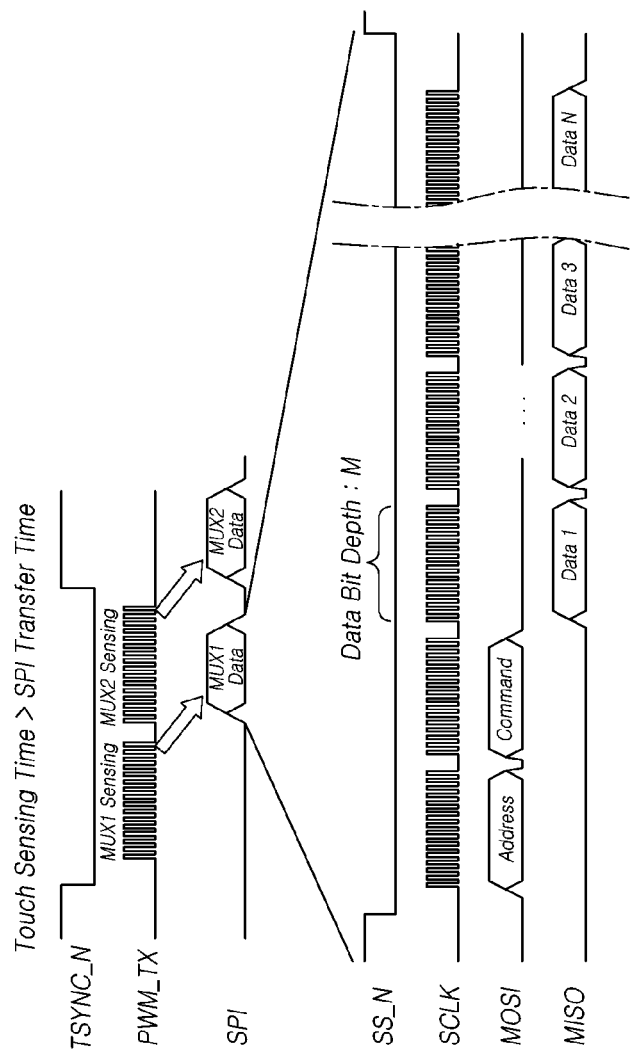
FIGS. 3 and 4 are diagrams illustrating a timing and a method of transmitting sensing data when a touch sensing time period is longer than a sensing data transmission time period in a touch display device according to the present disclosure.
Figure 4:
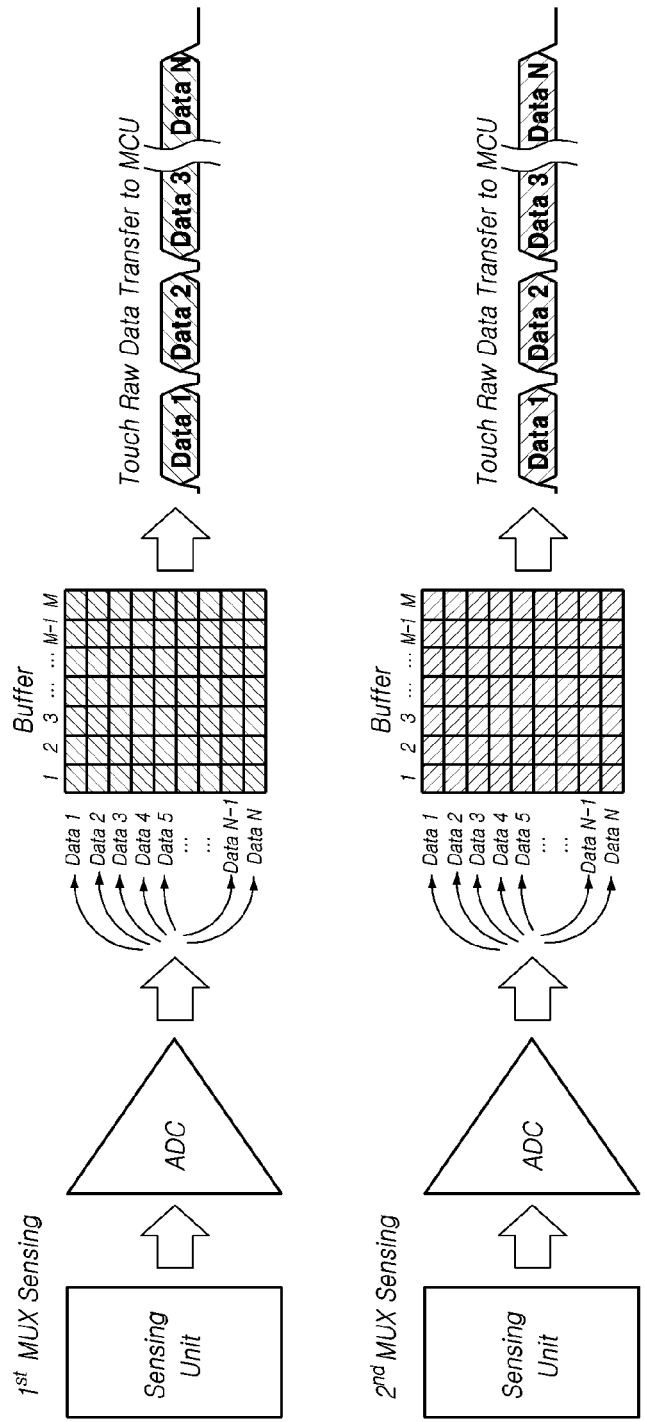

FIGS. 3 and 4 specifically illustrate touch sensing performed by the touch driving circuit 120 and a timing at which the touch driving circuit 120 transmits sensing data, and a case in which a touch sensing time period is set to be longer than a sensing data transmission time.

Referring to FIG. 3, the touch driving circuit 120 performs touch sensing by applying a touch driving signal to the touch sensor group TSG connected to a first multiplexer in a touch driving section.

Next, the touch driving circuit 120 performs touch sensing by applying a touch driving signal to the touch sensor group TSG connected to a second multiplexer and at the same time, transmits sensing data acquired from the touch sensor group TSG connected to a first multiplexer to the touch controller 130.

In the sensing data transmission section, the touch driving circuit 120 receives address information and command information through a Master Out Slave In (MOSI) port, and transmits the sensing data through a Master In Slave Out (MISO) port.

The touch driving circuit 120 may transmit the sensing data acquired from each touch sensor TS as M-bit data. FIG. 3 illustrates a case in which the number of touch sensors TS connected to a single multiplexer is N, and N pieces of M-bit sensing data are transmitted in the sensing data transmission section.

Referring to FIG. 4, the touch driving circuit 120 converts a sensing signal received from a touch sensor group TSG connected to the first multiplexer into digital sensing data, and then transmits the N pieces of M-bit sensing data to the touch controller 130 in a section where the sensing signal is received from the touch sensor group TSG connected to the second multiplexer.

Thereafter, in a similar manner, the touch driving circuit 120 transmits sensing data acquired from a touch sensor group TSG connected to the second multiplexer to the touch controller 130 in a section where the sensing signal is received from the touch sensor group TSG connected to another multiplexer.

Since the touch driving circuit 120 transmits the N pieces of M-bit sensing data in the sensing data transmission section, a transmission time longer than an N×M clock is required for sensing data transmission.

Since the touch driving circuit 120 performs touch sensing and sensing data transmission in parallel, a sensing time period is set to be a time longer than the N×M clock, which is a time required for sensing data transmission.

Figure 5:
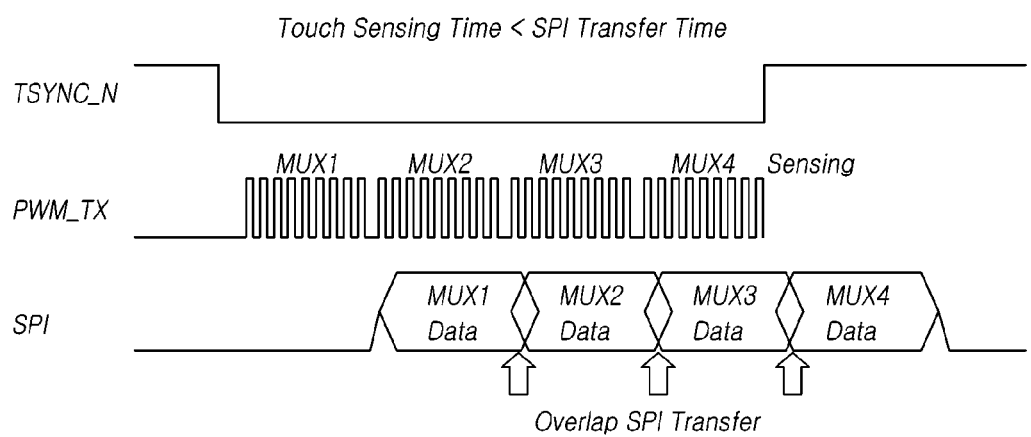
FIG. 5 is a diagram illustrating a timing for transmitting sensing data when a touch sensing time period is shorter than a sensing data transmission time period in a touch display device according to the present disclosure.

FIG. 5 is a diagram illustrating a timing for transmitting sensing data when a touch sensing time period is shorter than a sensing data transmission time period.

Referring to FIG. 5, when the touch sensing time period is shorter than the sensing data transmission time period, sensing data transmission is performed in parallel with touch sensing, so that the sensing data transmission sections overlap each other.

In particular, pen data sensing requires a lower resolution than that in finger position sensing or pen position sensing. Therefore, although the touch sensing time period can be set to be short, it is necessary to keep the touch sensing time period equal to a position sensing time period so that the sensing data transmission sections do not overlap each other.

Accordingly, there are problems in that the sensing time period is required to be unnecessarily increased for normal sensing data transmission and a desired amount of sensing data cannot be transmitted.

The touch display device 100 according to the present disclosure differently sets sensing data transmission bits according to data sensed in a touch driving section, so that the sensing time period of data for which a high resolution is not required may be set to be short.

Figure 6:
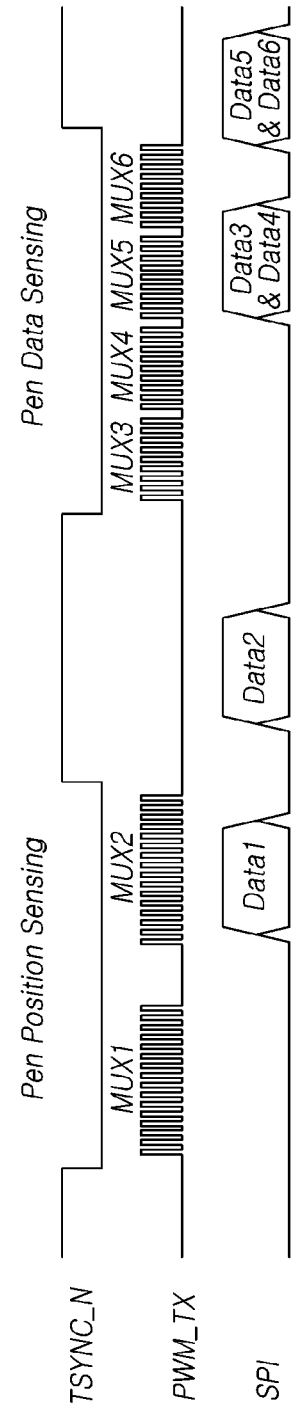
FIG. 6 illustrates a method of differently setting a sensing time period and a sensing data transmission packet depending on data to be sensed in a touch display device according to the present disclosure.

FIG. 6 illustrates a method of differently setting a sensing time period and a sensing data transmission packet according to a touch sensing section in the touch display device 100 according to of the present disclosure.

Referring to FIG. 6, a section in which the touch display device 100 according to the present disclosure senses a pen position and a section in which the touch display device 100 senses pen data are mainly illustrated.

The touch driving circuit 120 receives a sensing signal from a touch sensor group TSG connected to a first multiplexer during a first sensing time period in a section in which a pen position is sensed (hereinafter, also referred to as "first touch driving section").

Next, the touch driving circuit 120 receives the sensing signal from a touch sensor group TSG connected to a second multiplexer during the next first sensing time period and at the same time, transmits sensing data acquired from the touch sensor group TSG connected to the first multiplexer to the touch controller 130.

By way of example, each piece of sensing data acquired in a pen position sensing section may be composed of 16 bits and transmitted.

The touch driving circuit 120 receives the sensing signal from the touch sensor group TSG connected to a third multiplexer during a second sensing time period shorter than the first sensing time period in a section in which pen data is sensed (hereinafter, also referred to as "second touch driving section").

Next, the touch driving circuit 120 receives the sensing signal from the touch sensor group TSG connected to a fourth multiplexer during the next second sensing time period.

The touch driving circuit 120 composes the sensing data acquired during two second sensing time periods as one data packet.

By way of example, each sensing data acquired during each second sensing time period may be composed of 8 bits.

The touch driving circuit 120 transmits sensing data acquired from the touch sensor groups TSG connected to the third and fourth multiplexers in sections in which sensing is performed on a fifth multiplexer and sensing is performed on a sixth multiplexer, as one data packet.

Accordingly, the sensing data for a plurality of multiplexers acquired during a plurality of second sensing time periods may be transmitted as one data packet in a single sensing data transmission section, so that the second sensing time period in the pen position sensing section can be set to be shorter than the first sensing time period in the pen position sensing section.

Thus, an unnecessary sensing time period can be reduced in the pen data sensing section, and the transmission efficiency of pen data can be improved.

Figure 7:
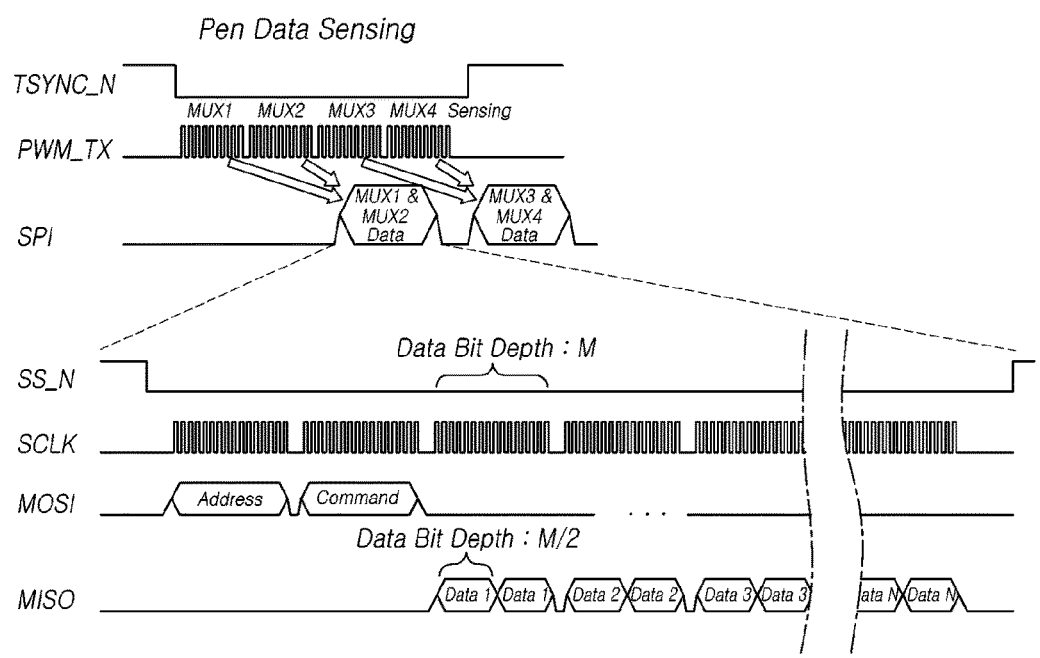
FIG. 7 illustrates a timing at which sensing data acquired during a plurality of sensing time periods is transmitted as one data packet in a touch display device according to the present disclosure.

FIG. 7 specifically illustrates sensing data transmitted by the touch display device 100 according to aspects of the present disclosure in a pen data sensing section.

Referring to FIG. 7, the touch driving circuit 120 performs pen data sensing during a second sensing time period shorter than a first sensing time period in the pen data sensing section of the touch driving section.

Next, the touch driving circuit 120 transmits sensing data in a smaller number of bits than those of sensing data transmitted in the pen position sensing section so that the sensing data can be transmitted while preventing the sensing data transmission sections from overlapping each other.

By way of example, the touch driving circuit 120 receives a sensing signal from a touch sensor group TSG connected to a first multiplexer during the second sensing time period, and then receives a sensing signal from a touch sensor group TSG connected to a second multiplexer during the second sensing time period.

In the touch driving circuit 120, the sensing data acquired from the touch sensor group TSG connected to the first multiplexer is composed of M/2 bits, and the sensing data acquired from the touch sensor group TSG connected to the second multiplexer is also composed of M/2 bits.

The touch driving circuit 120 receives a sensing signal from a touch sensor group TSG connected to each of a third multiplexer and a fourth multiplexer and at the same time, transmits the sensing data acquired from the touch sensor group TSG connected to each of the first multiplexer and the second multiplexer to the touch controller 130.

That is, pen data sensing is performed during the second sensing time period shorter than the first sensing time period of the pen position sensing section, and the sensing data acquired through pen data sensing is transmitted as M/2-bit data so that the sensing data acquired from the touch sensor group TSG connected to two multiplexers may be transmitted in a single sensing data transmission section.

Accordingly, the sensing data for a plurality of multiplexers may be transmitted in a single sensing data transmission section, so that the second sensing time period for each multiplexer in the pen data sensing section can be set to be shorter than the first sensing time period in the pen position sensing section.

Thus, an unnecessary sensing time period can be reduced while preventing the sensing data transmission sections from overlapping each other in the pen data sensing section.

Figure 8:
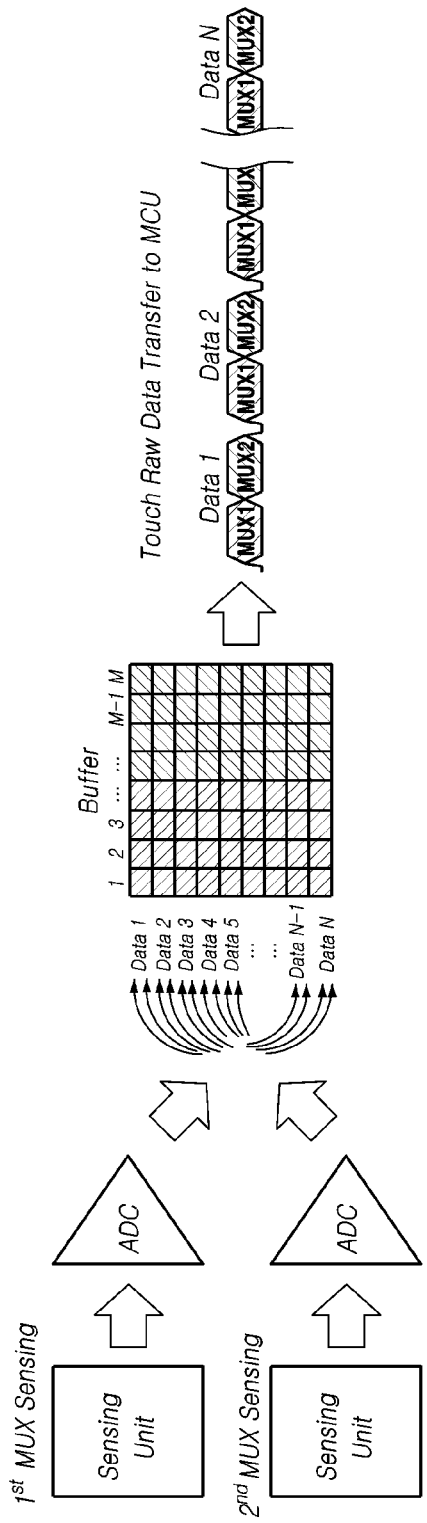
FIG. 8 illustrates a method in which sensing data acquired during a plurality of sensing time periods is composed as one data packet in a touch display device according to aspects of the present disclosure.

FIG. 8 illustrates a method in which the touch driving circuit 120 transmits sensing data in the touch display device 100 according to the present disclosure.

Referring to FIG. 8, in the touch driving circuit 120, sensing data acquired from a touch sensor group TSG connected to a first multiplexer is composed of M/2 bits, and sensing data acquired from a touch sensor group TSG connected to a second multiplexer is composed of M/2 bits.

Accordingly, sensing data for two multiplexers can be transmitted as one data packet.

The transmission of the sensing data for the two multiplexers requires a time period longer than an N×M clock, but the transmission of the sensing data is required to be performed once during a sensing time period for the two multiplexers, so that a second sensing time period that is the sensing time period in the pen data sensing section can be set to be shorter than a first sensing time period in the pen position sensing section.

The second sensing time period in the pen data sensing section may be set to be shorter than the first sensing time period in the pen position sensing section, thereby reducing an unnecessary sensing time period in the pen data sensing section.

In addition, the sensing data for a plurality of multiplexers may be transmitted through a single data packet in a single sensing data transmission section, thereby improving the transmission efficiency of the sensing data in the pen data sensing section.

Meanwhile, the touch driving circuit 120 in the touch display device 100 according to the present disclosure can minimize a loss of resolution by transmitting information about a Most Significant Bit (MSB) of the sensing data valid at the time of sensing data transmission in the pen data sensing section to the touch controller 130.

FIGS. 9A and 9B illustrate a method of transmitting information about an MSB of sensing data transmitted in a pen data sensing section by the touch driving circuit 120 in the touch display device 100 according to the present disclosure.

Referring to FIGS. 9A and 9B, the touch driving circuit 120 transmits information about an MSB of sensing data to be transmitted in a section of receiving command information from the touch controller 130 in the pen data sensing section, to the touch controller 130 through an MISO port.

The touch driving circuit 120 may determine the size of output data of an ADC at each transmission of the sensing data acquired from the touch sensor group TSG connected to each multiplexer to actively change and transmit the information about the MSB.

The touch driving circuit 120 may transmit the information about the MSB of the sensing data to be transmitted to the touch controller 130, so that the touch controller 130 may restore the sensing data using the information about the MSB, thereby minimizing the loss of the sensing data.

As shown in FIG. 9A, when the MSB of the sensing data to be transmitted in the pen data sensing section starts from a 12th bit, the touch driving circuit 120 transmits a numeral '12' through the MISO port in a section of receiving the command information from the touch controller 130.

The touch controller 130 may confirm that the MSB is the 12th bit through the numeral '12' received from the touch driving circuit 120, so that it is determined that valid sensing data is "A0", "B0", "70", . . . .

The touch driving circuit 120 determines the size of the output data of the ADC for each multiplexer, and changes and transmits the information about the MSB. Therefore, as shown in FIG. 9B, when the MSB of the sensing data is changed to 8, a numeral 8 is transmitted through the MISO port in the section of receiving the command information.

The touch controller 130 may confirm that the MSB is the 8th bit through the numeral 8 received from the touch driving circuit 120, so that it is determined that valid sensing data is "A0", "B1", "72", . . . .

Accordingly, the touch driving circuit 120 can change and transmit the information about the MSB according to the size of the sensing data to be transmitted to the touch controller 130, and the touch controller 130 may use the transmitted information about the MSB when restoring the sensing data, thereby minimizing a loss of the sensing data.

Figure 10:
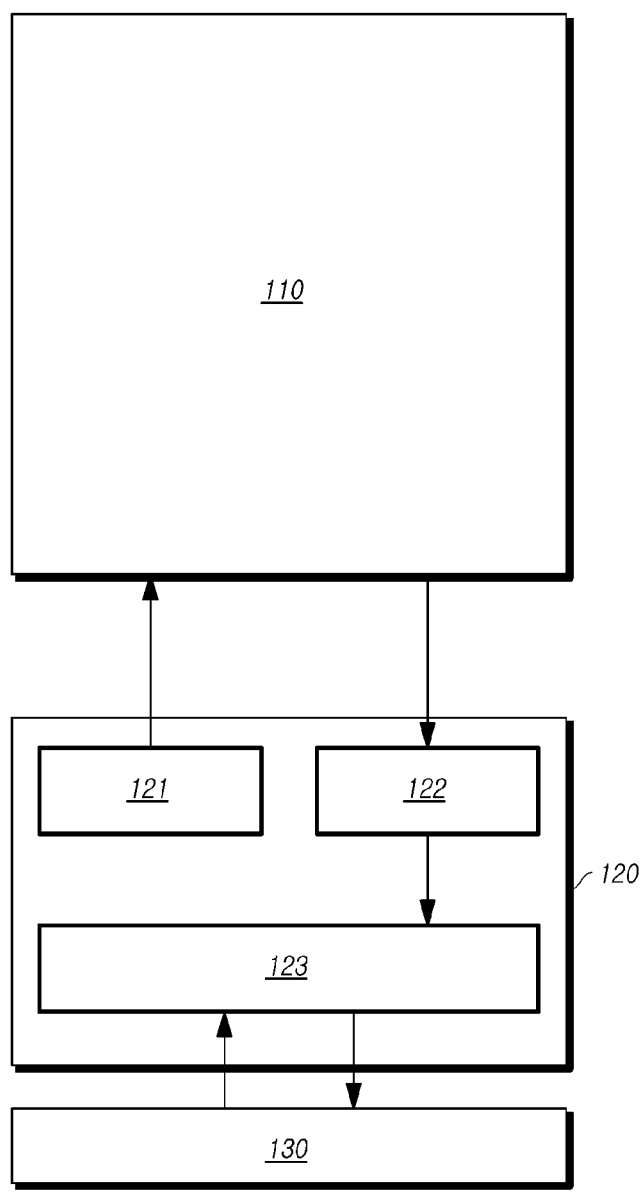
FIG. 10 is a diagram illustrating the schematic configuration of a touch driving circuit in a touch display device according to the present disclosure.

FIG. 10 schematically illustrates the configuration of the touch driving circuit 120 according to the present disclosure.

Referring to FIG. 10, the touch driving circuit 120 according to the present disclosure includes a touch sensor driving unit 121, a sensing signal reception unit 122, and a sensing data transmission unit 123.

The touch sensor driving unit 121 applies a touch driving signal to a plurality of touch sensors TS arranged on the touch display panel 110 in a touch driving section.

The touch sensor driving unit 121 sequentially applies the touch driving signal to a touch sensor group TSG connected to each multiplexer, applies the touch driving signal during a first sensing time period in a pen position sensing section, and applies the touch driving signal during a second sensing time period short than the first sensing time period in a pen data sensing section.

The sensing signal reception unit 122 receives the sensing signal from the touch sensor group TSG to which the touch driving signal is applied by the touch sensor driving unit 121.

The sensing signal reception unit 122 receives the sensing signal during the first sensing time period in the pen position sensing section, and receives the sensing signal during the second sensing time period in the pen data sensing section.

The sensing data transmission unit 123 converts the sensing signal received by the sensing signal reception unit 122 into digital sensing data, and transmits the digital sensing data to the touch controller 130.

The sensing data transmission unit 123 transmits the sensing data acquired during a plurality of second sensing time periods in the pen data sensing section as one data packet.

By way of example, the sensing data transmission unit 123 composes the sensing data acquired during one first sensing time period in the pen position sensing section to be M bits, and transmits the M bits sensing data to the touch controller 130.

Next, the sensing data acquired during one second sensing time period in the pen data sensing section may be composed of M/2 bits, so that the sensing data acquired during two second sensing time periods may be transmitted as one data packet.

The sensing data transmission unit 123 transmits the sensing data for two multiplexers acquired through pen data sensing, which does not require a high resolution, in one sensing data transmission section. Thus, the second sensing time period, which is a sensing time period for each multiplexer, can be set to be shorter than the first sensing time period in the pen position sensing.

Accordingly, an unnecessary sensing time period can be reduced in the pen data sensing section, and the transmission efficiency of the sensing data can be improved.

In addition, the sensing data transmission unit 123 may transmit information about an MSB of sensing data to be transmitted through the MISO port in a section of receiving command information from the touch controller 130 when the sensing data is transmitted.

Since the information about the MSB is transmitted in the section of receiving the command information from the touch controller 130, the information about the MSB of the sensing data to be transmitted may be transmitted to the touch controller 130 without increasing a transmission time.

Next, the touch controller 130 uses the information about the MSB received from the touch driving circuit 120 when restoring the sensing data, so that the sensing data can be transmitted while a loss of the sensing data is minimized.

Figure 11:
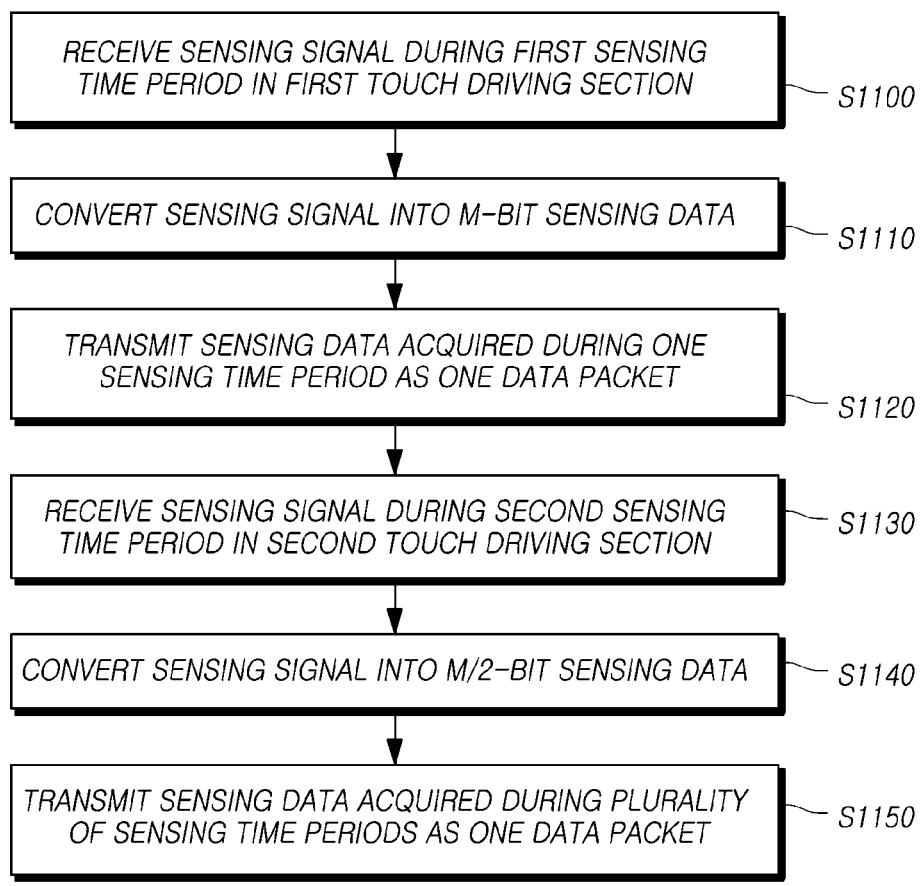
FIG. 11 is a flowchart illustrating a method of driving a touch driving circuit according to the present disclosure.

FIG. 11 illustrates a process of a method of driving the touch driving circuit 120 according to the present disclosure.

Referring to FIG. 11, in operation S1100, the touch driving circuit 120 according to the present disclosure receives a sensing signal from a touch sensor TS by driving the touch sensor TS during a first sensing time period in a first touch driving section.

The first touch driving section may be a sensing section that requires a high resolution such as finger position sensing or pen position sensing.

The touch driving circuit 120 converts the sensing signal received during the first sensing time period in the first touch driving section into digital sensing data in operation S1110, and composes the digital sensing data to be M bits to transmit the M-bit digital sensing data to the touch controller 130 in operation S1120.

In operation S1130, the touch driving circuit 120 receives the sensing signal from the touch sensor TS by driving the touch sensor TS during a second sensing time period in a second touch driving section.

Here, the second touch driving section may be a pen data sensing section that does not require a high resolution such as pen position sensing, and the second sensing time period may be a time period that is set to be shorter than the first sensing time period.

In operation S1140, the touch driving circuit 120 converts the sensing signal received during the second sensing time period in the second touch driving section into digital sensing data. Next, in operation S1150, the touch driving circuit 120 composes the digital sensing data to be M/2 bits and transmits the sensing data acquired during two second sensing time periods as one data packet.

As described above, according to the present disclosure, since the sensing data acquired during a plurality of sensing time periods in the pen data sensing section may be composed as one data packet and transmitted, the sensing time period in the pen data sensing section can be set to be short while preventing the sensing data transmission sections from overlapping each other.

In addition, by transmitting the information about the MSB of the sensing data to be transmitted through the MISO port in the section of receiving command information from the touch controller 130, the sensing data can be transmitted while minimizing a loss of the sensing data to be transmitted.

Although aspects of the present disclosure have been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have been described for the sake of brevity and clarity. The scope of the present disclosure shall be construed on the basis of the accompanying claims in such a manner that all of the technical ideas included within the scope equivalent to the claims belong to the present disclosure.

What is claimed is:

1. A touch display device comprising:
a touch display panel in which a plurality of touch sensors is arranged;
a touch driving circuit configured to receive a plurality of sensing signals from the plurality of touch sensors in a first touch driving section during a first sensing time period and to receive a plurality of sensing signals from the plurality of touch sensors in a second touch driving section during a second sensing time period shorter than the first sensing time period; and
a touch controller configured to receive sensing data converted based on the plurality of sensing signals from the touch driving circuit,
wherein the touch driving circuit transmits the sensing data acquired during one sensing time period in the first touch driving section as one data packet, and transmits the sensing data acquired during a plurality of sensing time periods in the second touch driving section as one data packet,
wherein each sensing signal from the plurality of touch sensors in the second touch driving section includes an amount of data less than that of each sensing signal from the plurality of touch sensors in the first touch driving section, and
wherein the plurality of sensing signals from the plurality of touch sensors in the first touch driving section includes first and second sensing signals, and the second sensing signal received by the touch driving circuit and the one data packet transmitted by the touch driving circuit during the one sensing time period in the first touch driving section are performed in parallel.

2. The touch display device of claim 1, wherein the touch driving circuit composes the sensing data acquired during one sensing time period in the first touch driving section to be M-bit data, and composes the sensing data acquired during one sensing time period in the second touch driving section to be M/2-bit data.

3. The touch display device of claim 1, wherein the touch driving circuit comprises a plurality of multiplexers connected to each touch sensor group including at least one touch sensor and applying a touch driving signal, and transmits the sensing data acquired by driving one multiplexer in the first touch sensing section as one data packet, and transmits the sensing data acquired by driving the plurality of multiplexers in the second touch sensing section as one data packet.

4. The touch display device of claim 1, wherein the touch driving circuit transmits information about a Most Significant Bit (MSB) of the sensing data transmitted in the second touch driving section to the touch controller.

5. The touch display device of claim 4, wherein the touch driving circuit transmits the information about the MSB in a section where command information is received from the touch controller.

6. The touch display device of claim 4, wherein the information about the MSB is received through a Master Out Slave In (MOSI) port and transmitted through a Master In Slave Out (MISO) port.

7. The touch display device of claim 4, wherein the touch driving circuit changes the information about the MSB according to a size of the sensing data transmitted in the second touch sensing section, and transmits the changed information about the MSB.

8. The touch display device of claim 1, wherein the first touch driving section includes a finger position sensing section or a pen position sensing section, and the second touch driving section includes a pen data sensing section.

9. The touch driving circuit of claim 8, wherein the sensing data transmission circuit transmits, to the touch controller, the information about the MSB in a section where command information is received from the touch controller.

10. The touch driving circuit of claim 9, wherein the information about the MSB is received through a Master Out Slave In (MOSI) port and transmitted through a Master In Slave Out (MISO) port.

11. The touch display device of claim 1, wherein sensing data transmission sections of the touch driving circuit do not overlap each other in the second touch driving section.

12. A touch driving circuit comprising:
a touch sensor driving circuit configured to output a touch driving signal to a plurality of touch sensors arranged in a touch display panel;
a sensing signal reception circuit configured to receive a plurality of sensing signals from the plurality of touch sensors during a first sensing time period in a first touch driving section, and to receive a plurality of sensing signals from the plurality of touch sensors during a second sensing time period shorter than the first sensing time period in a second touch driving section; and
a sensing data transmission circuit configured to convert the plurality of sensing signals into sensing data and to transmit the sensing data to a touch controller,
wherein the sensing data transmission circuit transmits the sensing data acquired during one sensing time period in the first touch driving section as one data packet, and transmits the sensing data acquired during a plurality of sensing time periods in the second touch driving section as one data packet,
wherein each sensing signal from the plurality of touch sensors in the second touch driving section includes an amount of data less than that of each sensing signal from the plurality of touch sensors in the first touch driving section, and
wherein the plurality of sensing signals from the plurality of touch sensors in the first touch driving section includes first and second sensing signals, and the second sensing signal received by the touch sensor driving circuit and the one data packet transmitted by the touch sensor driving circuit during the one sensing time period in the first touch driving section are performed in parallel.

13. The touch driving circuit of claim 12, wherein the sensing data transmission circuit transmits the sensing data acquired during one sensing time period in the first touch driving section as M-bit data, and transmits the sensing data acquired during one sensing time period in the second touch driving section as M/2-bit data.

14. The touch driving circuit of claim 12, wherein the sensing data transmission circuit transmits information about an MSB of the sensing data transmitted in the second touch driving section to the touch controller.

15. The touch driving circuit of claim 12, wherein sensing data transmission sections of the touch sensor driving circuit do not overlap each other in the second touch driving section.

16. A method of driving a touch driving circuit, comprising:
receiving a plurality of sensing signals during a first sensing time period in a first touch driving section from a plurality of touch sensors arranged in a touch display panel;
transmitting sensing data acquired during one sensing time period in the first touch driving section as one data packet;
receiving a plurality of sensing signals during a second sensing time period in a second touch driving section; and
transmitting sensing data acquired during a plurality of sensing time periods in the second touch driving section as one data packet,
wherein each sensing signal from the plurality of touch sensors in the second touch driving section includes an amount of data less than that of each sensing signal from the plurality of touch sensors in the first touch driving section, and
wherein the plurality of sensing signals from the plurality of touch sensors in the first touch driving section includes first and second sensing signals, and the second sensing signal received by the touch driving circuit and the one data packet transmitted by the touch driving circuit during the one sensing time period in the first touch driving section are performed in parallel.

17. The method of driving a touch driving circuit of claim 16, wherein the sensing data acquired during one sensing time period in the first touch driving section is transmitted as M-bit data, and the sensing data acquired during one sensing time period in the second touch driving section is transmitted as M/2-bit data.

18. The method of driving a touch driving circuit of claim 16, wherein the second sensing time period is shorter than the first sensing time period.

19. The method of driving a touch driving circuit of claim 16, further comprising:
transmitting information about an MSB of the sensing data transmitted in the second touch driving section.

20. The method of driving a touch driving circuit of claim 19, wherein the information about the MSB of the sensing data is transmitted in a section of receiving command information from a touch controller.

* * * * *